United States Patent [19]

Marsden, Jr. et al.

[11] 3,926,203

[45] Dec. 16, 1975

[54] METHOD OF TRANSPORTING CRUDE OIL AT LOW TEMPERATURES BY DISPERSION IN METHANOL

[75] Inventors: Sullivan S. Marsden, Jr., Stanford; Phillip R. Hooker, Ventura, both of Calif.

[73] Assignee: The Board of Trustees of the Leland Stanford Junior University, Stanford, Calif.

[22] Filed: June 5, 1974

[21] Appl. No.: 476,447

[52] U.S. Cl. .................. 137/13; 62/55; 208/370
[51] Int. Cl.² ............................................ F17D 1/16
[58] Field of Search ............ 137/13; 62/55; 252/8.3; 208/370, 19, 18; 166/DIG. 1; 44/80, 51

[56] References Cited
UNITED STATES PATENTS

| | | | |
|---|---|---|---|
| 3,670,752 | 6/1972 | Marsden | 137/13 |
| 3,730,201 | 5/1973 | Lefever | 137/13 |
| 3,776,248 | 12/1973 | Titus | 137/13 |

*Primary Examiner*—Alan Cohan
*Attorney, Agent, or Firm*—Donovan J. De Witt

[57] ABSTRACT

Crude oils or tars such as those obtained in arctic areas can be efficiently transported through pipelines at subzero or higher temperatures in the form of a dispersion of the oil in a methanol or a methanol-water dispersing medium. Thus, oil-methanol or oil-methanol-water dispersions, preferably those containing about 50 to 80 volume percent of the oil which are stabilized by the presence of a small amount of an effective surface-active dispersant, can readily be pumped through buried pipelines at temperatures below 0°C without causing thawing of the permafrost or the frozen body lying adjacent the pipeline. The necessary methanol can be prepared from natural gas produced along with the crude oil or from the gas cap of the same or another oil or gas field, thereby obviating the use of a separate pipeline to transport the natural gases. The methanol can readily be recovered from the dispersion, for use as a fuel or a chemical raw material, once the dispersion reaches a suitable destination.

11 Claims, No Drawings

METHOD OF TRANSPORTING CRUDE OIL AT LOW TEMPERATURES BY DISPERSION IN METHANOL

BACKGROUND OF THE INVENTION

Petroleum and natural gas are being discovered in ever increasing amounts in the arctic regions of the earth. While these discoveries have added to the exploitable energy reserves of the world, they have not yet been produced in any significant quantities. This is due to the lack of a suitable and generally acceptable transportation system for conveying these materials to the markets in temperate regions. The harsh climatic conditions, the physical properties of the crude oil, the construction problems associated with the arctic, the fragile ecology of the arctic and other factors have all imposed restrictions on the large-scale transportation of these commodities.

It is one of the several objects of this invention to provide a new transportation system which is readily operable despite these restrictions.

Natural gas is generally produced along with crude oil and is, itself, a valuable energy source. Because of its physical properties, natural gas requires a separate transportation system from that of the crude oil. Pipelines are used when the source and the market are on the same land mass. The recently developed but very expensive LNG (liquified natural gas) tankers must be used for transportation across bodies of water. It is another object of this invention to provide a single transportation method which will allow both the crude oil and the natural gas (in modified form) to be carried in a single pipeline.

It is well known that natural gas can be used as the raw material for the manufacture of methanol, which is well recognized as a motor fuel having very low pollution characteristics. While this manufacture of methanol is not per se a feature of this invention, it is an object thereof to encourage the production of this low pollution fuel from natural gas at sites near the wellhead by providing a novel transportation system which utilizes the methanol at the producing site.

Before presenting a detailed description of this invention, it is well to describe some of the background and the physical restrictions on transportation in the arctic. The seasonally low temperatures, high winds, snow, ice and sheer inaccessibility make any construction in the arctic more difficult and more expensive than that in temperate regions. An approach currently used by many people to estimate arctic construction costs is to multiply those in temperate regions by a factor of three or four. This, in itself, is a tremendous incentive for having a single rather than two separate transportation systems for oil and natural gas.

In addition, various soil conditions exist in the arctic which require special consideration in any construction project. One of these is permafrost and another is muskeg. Permafrost is a permanently frozen mixture of ice plus clay, silt, soil, sand, gravel and/or broken rock. Normally it is a solid construction base but thawing can lead to subsidence of the ground level, erosion, mud flows, and other environmental damage. Hence, it is a cardinal rule never to allow thawing of the dangerous types of permafrost. Introduction of a heat source or the removal or destruction of the tundra, a layer of dead vegetation which effectively blocks the sun's radiant heating, must be avoided. Because of the short growing season any environmental damage of this sort requires far longer for repair by natural processes than it would in nonarctic regions.

While the term muskeg seems to have various meanings, it is used here to describe an area which consists of low, swampy, soft ground interspersed with numerous lakes of various sizes, and with relatively poor drainage. When thawed during the summer months, travel over the muskeg is very difficult. Construction generally requires installation of gravel pads and other means to provide a firm base. When frozen, travel over the ice and solidified ground is relatively easy. Muskeg is one manifestation of the so-called "active zone" or annually thawing layer of ground which overlies permafrost. Others obviously exist in hills, mountains and valleys.

Still another ground condition that exists in the far north is a permanent shield of ice and/or snow which never melts. Construction on such a base poses many problems which have not yet been solved.

Crude oils are complex mixtures of many hydrocarbons and other organic compounds. Both their compositions and their physical properties vary widely not only from one oil field to another but also sometimes from one reservoir to another within a single field. They also contain differing amounts of dissolved vapors depending on the ambient temperature and the physical treatment they have undergone. As far as transportation goes, their most important properties are their viscosity (and various manifestations of this), their density, and their effective vapor pressure. In the arctic the change of these and other properties with temperature and their values at low temperatures are important. As temperature is lowered, the viscosity of crude oils increases, often very drastically. For many crude oils paraffinic or asphaltic materials start precipitating at a temperature known as the "cloud point". With further cooling a temperature is reached at which the oil will no longer flow, and this is known as the "pour point". Since the power required to pump oil in a pipeline increases with the viscosity, the advantages to pumping a heated, lower viscosity oil are apparent. Because the heat from a buried pipeline carrying hot oil would inevitably thaw the permafrost, such a pipeline must be constructed on supports above the ground. General experience in such earthquake-prone areas as southern California has shown that pipelines constructed above or on the surface of the ground are highly susceptible to damage during earthquakes while buried ones rarely are damaged. This, plus other factors, suggests the strong desirability of using a buried pipeline carrying crude oil in some form less viscous than it normally would be at ambient temperatures. Thus, it is an important object of this invention to provide a crude oil transportation system which allows the crude oil to remain liquid, and readily pumpable, at subfreezing temperatures, thereby permitting the oil to be conveyed underground by pipeline without thawing the adjacent permafrost areas or otherwise permanently damaging the fragile, natural arctic environment.

DESCRIPTION OF THE PRIOR ART

U.S. Pat. No. 3,670,752, to Marsden and Rose, discloses a method for transporting crude oils via pipeline in the arctic in the form of a 40 to 70 percent oil-in-brine emulsion. The brine contains enough salt to maintain the brine phase in the unfrozen condition even at relatively low, sub-freezing temperatures. The method has the disadvantage that energy is lost in pumping large quantities of the brine which, per se, has no economic value.

U.S. Pat. No. 3,730,201, to LeFever, also shows a method of pumping crude oil at cold temperatures, the oil being admixed with liquefied natural gas. The mixture in the pipeline is maintained under pressures sufficiently high as to maintain the liquefied component in the liquefied state, thereby adding additional operating costs to the process.

U.S. Pat. No. 3,675,671, to Sweeney and Alexander, shows a process for improving the pipeline flow characteristics of waxy crude oils in which high and low pour point crudes, respectively high and low in wax content, are blended together along with a polymeric pour point depressant. Also disclosed is a a relatively uneconomic prior art method in which somewhat the same effect is obtained by cutting waxy crudes with expensive lighter hydrocarbon fractions.

U.S. Pat. No. 3,618,624, to Vairogs, shows a method in which carbon dioxide or other miscible gas is introduced into a pipeline carrying a crude oil, the resulting miscible gas-fluid mixture being pumped under such conditions of temperature and elevated pressure as to prevent the formation of a gaseous phase. This method typically employs pipeline temperatures of 40° to 200°F and thus is not suited for use in arctic regions, where thawing of the ground regions adjacent the pipeline is to be avoided.

U.S. Pat. No. 3,735,770, to Day and Jaroslav, discloses a process for increasing the mobility of waxy crude oils that tend to gel on aging, the method involving the addition of an amphipathic additive such as a copolymer of ethylene and an acetate or acrylic ester, the mixture then being cooled below the nucleation temperature, with attendant shearing. This process is inherently expensive and of highly specialized application.

U.S. Pat. No. 3,679,582, to Wagenaar and van der Meij, discloses another relatively expensive and highly specialized method of reducing the pour point of waxy crude oils by the addition of a high molecular weight polysaccharide derivative having saturated aliphatic hydrocarbon chains of at least 15 carbon atoms each. Materials such as starch and cellulose are employed as reactants.

U.S. Pat. No. 3,542,044, to Hansen, Persinski, Bischof and Padden, discloses a method for reducing energy loss during flow of oil through a pipeline in which an aqueous solution of polyacrylamide and a dispersing agent are added to the oil. The resulting product has ability as a fracturing fluid in the secondary recovery of crude oil.

Chemical Catalog 965-3-019 (1973) and Bulletin 9651-025, GANEX Polymers, of GAF Corporation, New York, New York, disclose that polymers of the GANEX series have utility as petroleum additives, they functioning as sludge and detergent dispersants, viscosity index improvers and pour point depressants. It is also disclosed that these polymers are alkylated vinylpyrrolidone polymers which have molecular weights ranging from 7300 to 20,000 and have the structure

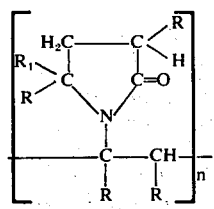

where R is hydrogen or alkyl.

SUMMARY OF THE INVENTION

It has been discovered that the objects of this invention can be achieved by the practice of a method by which the crude oil to be transported is dispersed in a methanol dispersing medium which may also contain a minor percentage of water. The resulting oil-in-methanol dispersions, preferably as stabilized by the addition of an effective surface-active dispersant, constitute liquids of reduced viscosity and thus of improved transportability which can readily be pumped through buried pipelines at subzero temperatures, thereby avoiding thawing the permafrost or other frozen body lying adjacent the pipeline. The term "crude oil", as used herein, includes tars.

In one of its aspects the invention contemplates recovering the natural gases produced along with the crude oil or recovered from the gas cap of the same or other oil or gas fields, then converting said gases, in known fashion, to methanol, preferably at sites adjacent the area of crude oil recovery.

The methanol product as obtained is then used as the dispersion medium for the crude oil. By operating in this fashion there is provided an integrated processing system whereby all the hydrocarbon products of the oil field, liquid as well as gaseous, can be consolidated into a single liquid product stream which is capable of being efficiently pumped, or otherwise transported, at temperatures ranging from below 0°C to those just below the temperature at which methanol may vaporize and form a separate gas phase. Expressed otherwise, this method consists of manufacturing methanol from natural gas, dispersing the crude oil in the methanol to form a suspension or dispersion somewhat like an emulsion, and then transporting this dispersion in either a buried pipeline or a tanker or both. If the pipeline is to transverse regions having a permafrost, then the crude oil-in-methanol dispersion must be cooled to and maintained at some temperature below 0°C in order to avoid thawing the permafrost. At the pipeline, tanker or refinery terminal, the dispersion is distilled or otherwise broken into its two main components, the crude oil and the methanol. The former is the normal feedstock for the refinery while the latter is a suitable, low pollution fuel for internal combustion engines. It can also serve as a fuel for SNG (substitute natural gas) plants, as a raw material for the petrochemical industry, and as a fuel for electric generating plants.

The foregoing integrated process has, inter alia, the important advantages of eliminating the need for a separate pipeline for natural gas, of upgrading the natural gas and reducing its transportation cost as the same is converted to methanol, and of incorporating the crude oil into a liquid dispersion of relatively low viscosity, capable of being efficiently pumped at temperatures below 0°C. The system also offers increased economies of operation when the liquid dispersion is pumped at temperatures well above 0°C due to its relatively low viscosity as compared with that of the same crude when not dispersed in the methanol dispersing liquid.

While, with agitation, it is possible to maintain a rather coarse dispersion of a crude oil in methanol, it is preferred to carry out the present invention by providing the oil-methanol (or oil-methanol-water) system with a surface-active agent which is capable of producing and stabilizing droplets or particles of smaller size, thus aiding the system. A great number of surface-active agents are available on the market and many thereof are capable of working to at least a limited extent in this particular service. However, chemical emulsifying agents of the sort normally used to prepare ordinary emulsions do not generally produce dispersions of crude oil in methanol of the desired stability and flow properties. Some will work to a limited extent and it may be that some would be satisfactory at low temperatures where stability would be expected to be greater. However, it has now been found that outstandingly good results for the purposes of this invention can be obtained by the use of polyvinylpyrrolidone polymers having a molecular weight of from about 7,000 to 20,000, or by the use of surface-active clays such as bentonite and attapulgite. Suitable polyvinylpyrrolidone polymers are those manufactured by GAF Corporation under its GANEX trademark, as referred to above in the description of the prior art. Thus, good results can be obtained using from about 0.1 to 1.5 pounds, per barrel of oil, of the polymers identified as GANEX V-216 (a viscous liquid having an average molecular weight of 7,300), with GANEX V-516 (a solid having an average molecular weight of 9,500) and with GANEX P-904 (a solid having an average molecular weight of 16,000), when working with systems containing about 50 to 80 or 90% by volume of the oil, with the balance being the methanol dispersing medium. Similarly good results at these oil-methanol levels can be obtained using from about 0.3 to 1.5 pounds, per barrel or oil, of AQUAGEL, a colloidal bentonite manufactured by National Lead Company, or of colloidal attapulgite. Amounts of these polymers and clays larger than 1.5 lbs/bbl. of oil can also be used, though with no appreciable improvement in results.

Whatever the surface-active dispersing agent employed, the material should be used in an amount which is effective to provide a satisfactory dispersion of the crude oil in the methanol (or methanol-water) dispersing medium. Satisfactory ranges have been given above for the GANEX and clay surface-active agents, and appropriate addition levels for other surface-active agents may readily be established by routine experimental tests such as adding small quantitites to a test tube of oil, shaking and observing the quality and stability of the resulting system.

Reference has been made above to the fact that good dispersions can be prepared at the indicated addition levels of the surface-active agent, in oil-methanol systems containing from about 50 to 80 and sometimes 90% by volume of the oil component. While equally good results can be obtained with systems containing less than 50 percent oil, the use of such relatively dilute dispersions is uneconomic when oil throughput in a pipeline is to be maximized. At the other end of the scale, the relative oil content of any given system should be kept below the level at which inversion of the system occurs, with the oil phase then becoming the dispersing medium. Thus, working with a system containing 0.5 lb GANEX V-216 per barrel of oil, inversion did not occur at the 80 percent oil level, though it did occur at the 90 percent oil level. Similarly, in systems containing 0.1 lb/bbl. oil of GANEX V-216, or 1 lb/bbl. oil of bentonite, and using an appreciable proportion of water (33 percent water — 67 percent methanol), inversion of the emulsion occurred at the 80 percent oil level. Here, again, experimental observation will indicate the extent to which the oil content of the system may be raised commensurate with the retention of satisfactory pumping characteristics and freedom from inversion.

Under certain cases it may be desirable to blend water into the dispersion. Thus, when using clays as the surface active dispersing agents, it is preferable that the dispersing medium contain at least 5 percent of water, the balance, 95 percent or less, being methanol. An overall satisfactory range for the aqueous portion of the dispersing medium is from about 0 to 35 percent, these and the other percentages expressed herein being on a volume basis. Thus, when methanol is in relatively short supply in the dispersion preparation area, resort can be had to using water up to about the 35 percent level, while still obtaining good results. However, to the extent that water is incorporated into the system, the capacity of the pipeline for the more desirable methanol and oil components is reduced. Accordingly, in a preferred practice of this invention, the water content of the dispersing medium is kept in a range of from about 0 to 20 percent, with methanol constituting from about 100 to 80 percent of the said medium.

DESCRIPTION OF THE PREFERRED EMBODIMENTS

The data presented in the following examples are illustrative of the invention, but are not to be construed as limiting.

Example 1

Dispersions were made variously containing 50, 60, 70 and 80 percent of Prudhoe Bay crude oil in both a 100 percent methanol dispersing medium and in one containing 75 percent methanol and 25 percent water, each dispersion being prepared using a low shear rate mixer in the presence of a GANEX V-216 dispersing agent added at a level of 0.5 lb/bbl of oil. All the dispersions were characterized by the oil being dispersed in the form of fine particles, and by good stability. Viscosity measurements were made at 1.5°, 20° and 24°C. with each dispersion, as well as with 100 percent Prudhoe Bay oil samples at these same temperatures to determine apparent viscosities, using a Fann VG Model 35 viscometer. The resulting observed viscosities ($u_a$) which are expressed below in Table 1, represent an arithmetic average of the readings at 300 rpm, plus ½ of the readings at 600 rpm. It is noted that in these cases, inversion took place in the case of samples which contained 90 percent of the crude oil.

TABLE 1

Viscosity of Prudhoe Bay Crude Oil-in-Methanol Dispersions Prepared with GANEX V-216 at level of 0.5 lb/bbl. oil

| Oil Concentration Percent by volume | Apparent Viscosity $\mu_a$, cp | | |
|---|---|---|---|
| | 100% methanol | | 75% methanol, 25% water |
| | 24°C | 1.5°C | 20°C |
| 50 | 4.6 | 5.2 | 6.4 |
| 60 | 6.1 | 7.1 | 8.5 |
| 70 | 9.2 | 9.8 | 11.1 |
| 80 | 14.7 | — | 20.7 |
| 90 | (inverted) | | (inverted) |
| 100 | 30.0 | 85.0 | 34.0 |

Example 2

Using the procedures of Example 1, viscosity measurements were made at −4°C using emulsions containing 50, 60 and 70 percent of Prudhoe Bay crude oil in a methanol (67%) — water (33%) dispersing medium, all emulsions being stabilized by the presence of GANEX V-216 added at a level of 0.1 lb/bbl oil. The results obtained, which are expressed below in Table 2, show the relatively low viscosity and inherently good pumpability of the emulsions at subfreezing temperatures.

TABLE 2

Viscosity of Prudhoe Bay Crude Oil-in-Methanol Dispersions Prepared with GANEX V-216 at level of 0.1 lb/bbl. oil at −4°C

| Oil Concentration Percent by volume | Temp. | Apparent Viscosity $\mu_a$, cp 67% methanol, 33% water |
|---|---|---|
| 50 | −4°C | 12.6 |
| 60 | −4°C | 18.0 |
| 70 | −4°C | 37.7 |
| 80 | −4°C | (inverted) |

Example 3

The procedures of Example 2 were repeated, except that colloidal bentonite clay (National Lead Company AQUAGEL) was employed as the surface active dispersing agent at a level of 1.0 lb/bbl oil. Here again, the observed viscosites at subfreezing temperatures were relatively low.

TABLE 3

Viscosity of Prudhoe Bay Crude Oil-in-Methanol Dispersions Prepared with Wyoming Bentonite at level of 1.0 lb/bbl Oil, at −4°C

| Oil concentration Percent by volume | Temp. | Apparent Viscosity $\mu_a$, cp 67% methanol, 33% water |
|---|---|---|
| 50 | −4°C | 15.2 |
| 60 | −4°C | 17.8 |
| 70 | −4°C | 20.2 |
| 80 | −4°C | (inverted) |

Example 4

In this example, viscosity measurements were made at temperatures ranging from −4°C to plus 20°C, using dispersions of Prudhoe Bay crude oil at levels of 50, 60 and 70 percent in a methanol(67%)— water(33%) dispersing medium, all dispersions containing the AQUAGEL bentonite at a level of 0.4 lb/bbl oil. The viscosity levels, as reported below in Table 4, are low. Further, the stability of all samples was very good.

TABLE 4

Viscosity of Prudhoe Bay Crude Oil-in-Methanol Dispersions Prepared with Wyoming Bentonite at level of 0.4 lb/bbl oil

| Oil Concentration Percent by volume | Temp. | Apparent Viscosity, $\mu_a$, cp 67% methanol, 33% water |
|---|---|---|
| 50 | 20°C | 6.5 |
| 60 | 20°C | 8.5 |
| 70 | 20°C | 13.0 |
| 50 | 9°C | 9.0 |
| 60 | 9°C | 11.5 |
| 70 | 9°C | 18.5 |
| 50 | 2°C | 11.0 |
| 60 | 2°C | 15.0 |
| 70 | 2°C | 25.0 |
| 50 | −4°C | 13.8 |
| 60 | −4°C | 17.0 |
| 70 | −4°C | 30.5 |

In still other operations conducted in the same manner as described above in the several examples, good dispersions are prepared using GANEX P-904 (a solid material having an average molecular weight of 16,000) or GANEX V 516 (a solid having an average molecular weight of 9,500) at levels in a range of 0.5 to 1.0 lb/bbl oil as the surface-active dispersing agent. Similarly, good results can be obtained by using attapulgite clay, aided, if desired, by the addition of small amounts of caustic.

Once the dispersions described herein have reached a location where the components thereof are to be separated from one another, conventional methods of separation can be used. Thus, if allowed to stand some of the dispersions separate into two layers, though the methanol layer obtained in this fashion will be somewhat impure. The separation is preferably effected by distilling the dispersion, or at least the upper, methanol layer thereof. In one experimental run, distillation of a 300 ml sample of a 70 percent dispersion of Prudhoe Bay crude in methanol, employing a vacuum-jacketed glass column provided with 10 bubble plates, produced 94 ml of a distillate up to a temperature of 65°C, the approximate boiling point of methanol. Evidently a small amount of the more volatile components of the crude oil distilled over with the methanol.

The methods normally used for emulsion preparation work well with these dispersions. These are described in such monographs as *Emulsions, Theory and Practice*, by P. Becher (Reinhold Publishing Co.) and *Emulsion Science*, by P. Sherman (Academic Press). They include mechanical mixing and blending as well as more exotic methods such as ultrasonic emulsification. We have found that mechanical mixers operating at relatively low shear rates work well in the laboratory in a manner similar to that used for emulsion preparation. Hence the use of industrial emulsification equipment should also work well here on a larger scale.

The present invention calls for the manufacture of methanol from natural gas, preferably from those components of said gas, namely methane and ethane, which are not readily redissolved in the cold crude oil. However, in some circumstances propane and butane might also be desirable feedstocks if more of the end-product methanol is needed to create stable dispersions. As mentioned above, the amount of natural gas produced with crude oil varies widely from field to field as well as with the operating conditions of the gas-oil separators for a given field. In some cases it will be necessary to use propane and/or butane for methanol manufacture whereas in other cases these vapors can be redissolved in the cold dispersed crude oil or possibly the methanol or both and transported as such.

Methods for manufacturing methanol are well known and reference may be had, for example, to works such as *The Petrochemical Industry, Market and Economics*, by A. V. Hahn, McGraw-Hill Book Co., N.Y. (1970) for a description of the various available methods. The particular method chosen will depend on the feed factors discussed above, as well as on such considerations as reliability and low-maintenance costs.

Methanol manufacturing units could be constructed on barges in temperate regions and then towed to installation sites in the arctic during the summer months. Such an approach has already been used elsewhere for petroleum refineries and petrochemical plants. The pollution from methanol manufacturing plants would appear to be minor, but care must be taken to avoid thermal pollution. The possibility of using waste heat for space heating for domestic and/or limited agricultural use may be attractive in areas not underlain by permafrost. In any event, extreme care must be taken to avoid loss of the methanol to the surroundings because of its known toxic properties for animal life.

It is not known whether the chemical dispersing agents can be manufactured at the site of the dispersing plant but this should be considered to eliminate the problem of transporting them to the site. The ones used are derivatives of acetylene and one would expect that they could be manufactured from a small amount of the natural gas. Other dispersing agents which can be manufactured from petroleum may well be suitable here.

Ordinary pipeline steel alloys suitable for both welding and operation at the low temperatures found in the arctic should be used. Pipe made of such alloys has already been manufactured in Japan for the hot oil line proposed for Alaska. In those sections of the pipeline transversing dangerous permafrost, the pipeline must operate at temperatures below the freezing point of water to avoid thawing the permafrost. Cooling plants will be required for this and they will probably be located at or near the pump stations. Because of this temperature control, the entire pipeline can be buried which is a much safer arrangement during times of earthquakes and a much less expensive method of construction than the supports required for a hot oil line. Since methanol freezes at temperatures well below 0°C, there is no effective lower limit of operation imposed by this factor. Even the 67% methanol — 33% water solution proposed as a possible modification freezes at about —93°C and so this also imposes no real limitation. A common practice used in engineering construction work to stabilize wet ground is to freeze it. In traversing muskeg and other wet ground, the cold pipeline will have heat transferred to it because of the temperature difference. Under proper operating conditions this can be enough to freeze the water in the surrounding ground and hence stabilize it considerably. This is expected to be a significant benefit particularly in earthquake-prone regions such as in Alaska.

It is not necessary that all sections of the pipeline be at the same temperature and that the temperature be the same in each section at all times. Those sections not traversing dangerous types of permafrost can be allowed to warm up by the natural conversion of pumping power to heat. During the warmer times of the year, individual sections can be allowed to operate at the temperature of the surrounding ground by not using full cooling capacity unless it is advantageous to freeze and stabilize the ground. When crossing areas having permanent ice and snow, it would appear that the operating temperature should always be below 0°C in order to avoid melting this. When going underneath significant bodies of water such as those between the arctic islands of Canada, the pipeline can be allowed to seek the same temperature as the surrounding water which will typically be about 28°F. Hence, there is considerable versatility built into the pipeline system to accomplish various goals.

At the expected temperatures of operation, the combined vapor pressure of the methanol and the crude oil will be so low that no problems with vaporization at the inlet end of the pumps would be expected. The low density of the methanol (0.7931 gms/cc) is an important factor in several respects. It is not far from that of many crude oils which will contribute to the physical stability of the dispersions. Since pumping horsepower is directly proportional to density, pumps of comparable size to those for an oil pipeline may be used even if the viscosity is somewhat greater. Lower density than the crude oil alone will also mean less surge and less horsepower required per unit volume for changes of elevation.

A pipeline carrying any kind of methanol dispersion will terminate at a port or at an oil refinery. If the latter, then the components can be separated by distillation or by another physical separation method. At a port, the crude oil dispersion can be loaded directly onto tankers. The latter may be surface going ships, or in the Arctic Ocean and other northern bodies of water having surface ice and iceburgs, they may be nuclear powered submarine tankers.

A problem associated with onloading of tankers of any sort in the arctic is the slow flow rate of many crude oils because of the low temperatures. Hot oil tankers require continual heating during the voyage and also transfer considerable heat to the environment. Cold dispersions of crude oil-in-methanol would obviously be an answer to this problem. Such transportation of crude oil need not be associated with a pipeline system at all other than the loading pipes. In such a case, the chemical dispersant or other material could be sent to the place the dispersion is prepared as partial ballast for the tanker during the return trip. If more methanol is needed than can be conveniently manufactured in the arctic, then it too can be sent in ballast.

We claim:

1. A method of transporting hydrocarbon products through a pipeline from arctic hydrocarbon recovery locations to another location without inducing thawing of the permafrost or other frozen body lying adjacent the pipeline, said method comprising recovering both crude oil as well as natural gases at the arctic locations, converting at least a portion of the recovered gases to methanol, admixing the crude oil with a dispersing medium made up of from about 100 to 65% of the said methanol and about 0 to 35% water in the presence of a surface-active dispersant of such a nature, and present in such amount, as to stabilize the resulting dispersion, said dispersing medium being employed in such proportions as to provide a stable dispersion of the oil-in-methanol type, cooling said dispersion to a temperature below freezing to provide a cold liquid dispersion of good pumpability which does not cause melting of frozen bodies lying adjacent a pipeline when the dispersion is pumped therethrough, and pumping the cold dispersion through a pipeline to the desired location.

2. The method of claim 1 wherein the natural gases converted to methanol represent the gas fraction which is not readily redissolved in the cooled oil-in-methanol dispersion, and wherein the remaining natural gases are redissolved in said dispersion before the same is pumped through the pipeline.

3. The method of claim 1 wherein the dispersant is an alkylated vinylpyrrolidone polymer having a molecular weight ranging from about 7,000 to 20,000.

4. The method of claim 1 wherein the dispersant is a surface-active clay and wherein the dispersing medium contains at least about 5 percent water.

5. A crude oil-containing composition which remains in the liquid state at temperatures below freezing and is adapted to be readily transported through a pipeline at said temperatures, which comprises a stablized dispersion of crude oil in a methanol dispersing medium containing from about 100 to 65% methanol and from about 0 to 35% water, together with a surface-active agent acting to stabilize said dispersion.

6. The composition of claim 5 wherein there is present an amount of an alkylated vinylpyrrolidone polymer which is effective to stabilize the crude oil-in-methanol dispersion.

7. The composition of claim 5 wherein there is present an amount of a surface active clay which is effective to stabilize the crude oil-in-methanol dispersion, and wherein the dispersing medium contains at least about 5 percent water.

8. A method for reducing the apparent viscosity of crude oils by providing a dispersion of the oil which remains liquid and readily pumpable at temperatures below freezing, which comprises admixing the crude oil with a methanol dispersing medium containing from about 100 to 65% methanol and from about 0 to 35% water in the presence of a surface-active dispersant capable of stabilizing the resulting dispersion, said methanol dispersing medium being employed in such proportions as to provide a dispersion of the oil-in-methanol type.

9. The method of claim 8 wherein the surface-active dispersant is an alkylated vinylpyrrolidone polymer having a molecular weight ranging from about 7000 to 20,000.

10. The method of claim 8 wherein the surface-active dispersant is a surface-active clay and wherein the dispersing medium contains at least about 5 percent water.

11. The method of claim 8 wherein the oil-in-methanol dispersion is cooled to a temperature below 0°C and wherein the resulting cooled dispersion is then pumped through a buried pipeline without causing any thawing of any permafrost or other frozen body lying adjacent the pipeline.

* * * * *